3,484,261
DISPERSIONS OF INSOLUBLE, INORGANIC SOLID MATERIAL IN ORGANIC MEDIA WITH HALF-ESTERIFIED STYRENE-MALEIC ANHYDRIDE COPOLYMERS
Richard J. Pratt, Park Forest, and Robert J. Conboy, Rockford, Ill., assignors to Sinclair Research, Inc., New York, N.Y., a corporation of Delaware
No Drawing. Filed Nov. 10, 1966, Ser. No. 593,280
Int. Cl. C08j 1/36, 1/48; C08h 17/02
U.S. Cl. 106—308
17 Claims

ABSTRACT OF THE DISCLOSURE

Stable dispersions of finely divided, insoluble, inorganic solid materials in liquid organic media are obtained with a small amount of a partially-esterified copolymer of styrene and maleic anhydride as the dispersing agent. The partially esterified copolymer is soluble in the organic medium and is an about 25 to 100 percent half ester of a copolymer having about 1 to 5 moles of styrene per mole of maleic anhydride and a molecular weight of about 400 to 5000 with an alkanol of about 4 to 20 carbon atoms.

---

This invention relates to dispersions of insoluble, inorganic solid materials in liquid organic media, which contain certain polymeric materials as dispersing agents.

Dispersions of finely-divided, insoluble, inorganic solid materials such as inorganic pigments and fillers in organic media are extensively used in the production of paints and the like. Stable dispersions of the inorganic pigment in the organic solvent prevent the occlusion and settling of the inorganic solid pigments and shorten the time necessary for grinding the pigments. Generally, a dispersing agent is employed in the organic solvent media and the agent enables a uniform distribution of the solid material in the organic media. To be commercially desirable, dispersions of insoluble, inorganic solid materials in organic media should remain stable when used in commercial processes and should employ additives that can be produced economically and used in sufficiently low, economical concentrations. Further, the dispersing additive must possess sufficient affinity for the inorganic solid material, and most importantly, be soluble in the organic media to effect a complete and stable dispersion.

The dispersions of the present invention employ a dispersing agent which possesses the above desirable characteristics. Moreover, the dispersions of the present invention were found to be stable in the presence of an alcohol, a desirable solvent for acrylic resin vehicles employed in coating and paint manufacturing. We have found that a small amount of a partially esterified styrene-maleic anhydride copolymer effectively disperses insoluble, inorganic solid materials in liquid organic media. The partial ester of a styrene-maleic anhydride copolymer has been found to possess a strong affinity for the inorganic solids and is soluble in a variety of organic media. These factors make it unnecessary to treat the partially esterified copolymer in costly additional steps such as ionic salt-forming, etc., to render it attractable to the inorganic solid material or soluble in the organic media. Furthermore, the availability of several free carboxyl groups for attachment to the surface of the inorganic particle results in more efficient use and therefore requires lower concentrations of the partially esterified copolymer, apparently since the attachment of one carboxyl group to the inorganic particle tends to pull the other carboxyl groups close enough to the particle surface to interact.

The amount of the partial ester employed in the dispersions of the invention is that effective to disperse the inorganic solid materials in the organic media. The actual amount employed may be dependent upon the final viscosity desired but often falls in the range of about 0.5 to 5% or more, more often about 0.5 to 1.5% by weight of the inorganic solid material.

The partially esterified styrene-maleic anhydride copolymer is a half ester of a copolymer of about 1 to 5 moles, preferably 1 to 3 moles of styrene per mole of maleic anhydride. Suitable styrene-maleic anhydride copolymers for preparing the partial esters used in the dispersions of the invention are those having an average molecular weight of up to about 5000, say at least about 400, preferably about 1000–3000. If desired, maleic acid can be employed instead of the anhydride in preparing the copolymer, and the term "maleic anhydride" as used here and in the claims is intended to include maleic acid.

The esterification of the styrene-maleic anhydride copolymer can be effected with an aliphatic monohydric alcohol, preferably saturated, having about 4 to 20, preferably 6 to 12 carbon atoms. As suitable examples of esterifying alkanols may be mentioned, for instance, t-butyl alcohol, isoamyl alcohol, isooctyl alcohol, n-octanol, octadecyl alcohol, etc. The extent of esterification of the copolymer is that sufficient to give solubility of the esterified copolymer in the organic media. Generally, about 25 to 100%, preferably 65 to 90%, based upon half-esterification, of the carboxyl groups of the styrene-maleic anhydride copolymer are esterified.

Preparation of the styrene-maleic anhydride copolymer can be by known methods. A preferred method is by solution polymerization where the monomers are polymerized in a suitable solvent employing as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents. such as cumene, p-cymene, xylene, toluene, etc. Other suitable solvents are the ketones, such as methylethylketone. The preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. The subsequent partial esterification can be effected by various suitable techniques disclosed in the art.

The insoluble inorganic solid materials may be present in the dispersions of the invention in amounts up to about 85%, preferably about 40 to 75%, based on the liquid organic medium. Some examples of insoluble, inorganic solid materials include, for instance, finely-divided solid inorganic pigments and fillers such as titanium dioxide, calcium carbonate, barium carbonate, zinc oxide, celite, etc. The materials in finely-divided form are generally less than about 25 mircons in size. Suitable organic media for the dispersions of the invention include non-reactive organic liquids often boiling below 500° F. such as aromatic solvents, for example, xylene, toluene, turpentine, etc.; alcohols, for example, methanol, ethanol, butanol, etc.; ketones, for example, methyl ethyl ketone, methyl isopropyl ketone, etc.; liquid organic melts, for example, polyethylene melts; certain liquid resins, for example, liquid epoxy and alkyd resins; drying oils, such as linseed oil, etc.

The following examples will further illustrate the process of our invention but are not to be considered limiting.

the Half-Ester Derivative A per hundred grams of pigment.

For comparison, the same tests using the identical procedure were run using a commercial dispersing agent designated Commercial Dispersant B employed as a grinding aid for reducing the grinding time of titanium dioxide. The results are listed in Table I.

TABLE I.—Result of Pigment Deflocculation

| Pigment | Particle size | Half-ester derivative A, p.p.h. of Pigment | Viscosity (cps.) [1] | Pigment solids (percent) |
|---|---|---|---|---|
| Dispersing with half-ester derivative A: | | | | |
| Silicon dioxide | 40 | 0.13 | 140 (3) | 67 |
| Magnesium silicate (talc) | 4-6 | 8.05 | No effect | 22 |
| Barium sulfate | 0.18 | 0.21 | 90 (3) | 55 |
| Potassium aluminum silicate | 40 | 0.22 | 1400 (4) | 43 |
| Calcium carbonate | 40 | 0.11 | 150 (3) | 69 |
| TiO$_2$ | 0.25 | 1.22 | 600 (3) | 50 |
| Hydrated aluminum silicate | 1.0 | 1.05 | 1000 (3) | 49 |
| Bentonite | 40 | 1.32 | No effect | 60 |
| Barium carbonate | 45 | 0.79 | 90 (3) | 65 |
| Clay | 0.2 | 1.23 | 800 (3) | 37 |
| 12% Leaded zinc oxide | 40 | 0.18 | 275 (3) | 70 |
| Diatomaceous earth | 4-12 | 2.9 | [2] | 28 |
| TiO$_2$ | 0.25 | 0.35 | 850 (3) | 56 |
| Dispersing with Commercial Dispersant B: | | | | |
| TiO$_2$ | 0.25 | 1.06 | 200 (3) | 54 |
| Barium sulfate | 0.18 | 0.27 | 40 (3) | 55 |
| Calcium carbonate | 40 | 0.18 | 55 (3) | 69 |
| Titanium pigment | 0.25 | 0.97 | 70 (3) | 50 |

[1] Cps. (centipoise) at 20 r.p.m., spindle number in bracket.
[2] Too dilatant to measure.

EXAMPLE I

Four hundred and ten parts of a styrene-maleic anhydride copolymer having a ratio of styrene to maleic anhydride of 3 to 1 and a molecular weight of about 1900 were heated at about 180–200° C. for four hours with 130 parts of isooctyl alcohol. Analysis of the cooled ground product indicated about 85% half-ester formation.

A deflocculation study was conducted using several inorganic pigments and fillers, and the 85% half-ester of the styrene-maleic anhydride copolymer prepared in Example I, designated Half-Ester Derivative A.

The procedure for the study was as follows: The pigment is treated with enough xylene to afford a thick paste. At this point the dry solids are generally about 50–65% of the total. A 15% xylene solution was made by warming 15 grams of the 85% half-ester prepared in Example I above (Half-Ester Derivative A) with 85 grams of xylene.

Aliquot portions of 0.10 ml. of the Half-Ester Derivative A solution were added with stirring. Viscosity measurements were begun when a definite fluidization began. When the slurry reached 1000 centipoise viscosity, the container was sealed and placed on a paint shaker for 30 minutes. This was necessary to insure as near a de-agglomeration as possible.

Additional 0.10 ml. of aliquot portions of the Half-Ester Derivative A solution were added until subsequent additions afforded a slight viscosity increase. The minimum viscosity was recorded along with the weight of The data in Table I show that all of the pigments and fillers tested except the magnesium silicate (talc) and bentonite could be dispersed by adding a small amount of a partially esterified styrene-maleic anhydride copolymer to the mixture of pigment and organic solvent. The fact that less than 1.5 weight percent of the half-ester derivative per hundred grams of pigment was generally needed to reach minimum viscosity indicates the dispersing power of the partially esterified styrene-maleic anhydride copolymer to be unusually high. The dispersing power of the partially esterified styrene-maleic anhydride copolymer is further demonstrated by comparing the data resulting from the tests using Commerical Dispersant B. The addition of Commercial Dispersant B effected a greater reduction in viscosity, but a larger amount of Commercial Dispersant B was required.

In addition to being a powerful dispersant, the dispersion using a partially esterified styrene-maleic anhydride copolymer was found to be stable in the presence of an alcohol. The data in Table II demonstrate the effect of an addition of a small amount of methanol to dispersions of titanium dioxide in xylene, dispersed using both Commercial Dispersant B and Half-Ester Derivative A. The TiO$_2$ fluid dispersion employing Commercial Dispersant B reverted back to a paste when the methanol was added. The TiO$_2$ fluid dispersion employing Half-Ester Derivative A was only slightly affected by the methanol, while another sample of TiO$_2$ pigment dispersion employing Half-Ester Derivative A exhibited no change in viscosity in the presence of methanol.

TABLE II.—Effect of Methanol on Viscosity of Dispersed Pigments

| Dispersing agent | Pigment dispersed | Viscosity initial (cps.) | Volume methanol added per 100 g. TiO$_2$ (ml.) | Viscosity final (cps.) |
|---|---|---|---|---|
| Half-ester derivative A | TiO$_2$ | 1,260 | 1.0 | 1,850 |
| Commercial dispersant B | TiO$_2$ | 290 | 1.0 | 100,000 |
| Half-ester derivative A | TiO$_2$ | 1,460 | 1.0 | No change |

It is claimed:

1. A dispersion consisting essentially of a liquid organic medium having dispersed therein a finely-divided, inorganic solid material insoluble in said organic medium, and a small amount of an about 25 to 100 percent half-esterified copolymer of styrene and maleic anhydride, the remaining carboxyl groups being in the acid form, said esterified copolymer being the reaction product of a copolymer having about 1 to 5 moles of styrene per mole of maleic anhydride and a molecular weight of about 400 to 5000 and an alkanol of about 4 to 20 carbon atoms, said amount of esterified copolymer being sufficient to effectively disperse said inorganic solid material in said liquid organic medium.

2. The dispersion of claim 1 wherein said inorganic solid material is a solid inorganic pigment.

3. The dispersion of claim 1 wherein said inorganic solid material is a solid inorganic filler.

4. The dispersion of claim 1 wherein the molar ratio of styrene and maleic anhydride in said copolymer is about 3:1.

5. The dispersion of claim 1 wherein said organic medium is an aromatic solvent.

6. The dispersion of claim 5 wherein said aromatic solvent is xylene.

7. A dispersion consisting essentially of a liquid organic medium having dispersed therein up to about 85 percent based upon said organic medium of a finely-divided inorganic solid material insoluble in said organic medium, and about 0.05 to 5 percent based upon said inorganic solid material of an about 25 to 100 percent half-esterified copolymer of styrene and maleic anhydride, the remaining carboxyl groups being in the acid form, said esterified copolymer being the reaction product of a copolymer having about 1 to 5 moles of styrene per mole of maleic anhydride and a molecular weight of about 400 to 5000 and an alkanol of about 4 to 20 carbon atoms.

8. The dispersion of claim 7 wherein said inorganic solid material is a solid inorganic pigment.

9. The dispersion of claim 7 wherein said inorganic solid material is a solid inorganic filler.

10. The dispersion of claim 7 wherein the molar ratio of styrene and maleic anhydride in said copolymer is about 3:1.

11. The dispersion of claim 7 wherein said organic medium is an aromatic solvent.

12. The dispersion of claim 11 wherein said organic medium is xylene.

13. A dispersion consisting essentially of a liquid organic medium having dispersed therein about 40 to 75% based upon said organic medium of a finely-divided inorganic solid material insoluble in said organic medium and about 0.5 to 1.5 percent based upon said inorganic solid material of an about 65 to 90 percent half-esterified copolymer of styrene and maleic anhydride, the remaining carboxyl groups being in the acid form, said esterified copolymer being the reaction product of a copolymer having about 1 to 3 moles of styrene per mole of maleic anhydride and a molecular weight of about 1000 to 3000 and an alkanol of about 6 to 12 carbon atoms.

14. The dispersion of claim 13 wherein said inorganic solid material is a solid inorganic pigment.

15. The dispersion of claim 13 wherein said inorganic solid material is a solid inorganic filler.

16. The dispersion of claim 13 wherein said alkanol is isooctyl alcohol.

17. The dispersion of claim 13 wherein said liquid organic medium is xylene.

References Cited

FOREIGN PATENTS 717,838  11/1954  Great Britain.

JAMES E. POER, Primary Examiner

U.S. Cl. X.R.

106—309

UNITED STATES PATENT OFFICE
CERTIFICATE OF CORRECTION

Patent No. 3,484,261          Dated December 16, 1969

Inventor(s) Richard J. Pratt and Robert J. Conboy

It is certified that error appears in the above-identified patent and that said Letters Patent are hereby corrected as shown below:

Column 2, line 67, delete "mircons" and insert therefor --microns--.

Table II, delete "$\underset{>>}{==}$".

Claim 7, line 5, delete "0.05" and insert therefor --0.5--.

SIGNED AND SEALED
SEP 8 - 1970

(SEAL)
Attest:

Edward M. Fletcher, Jr.
Attesting Officer

WILLIAM E. SCHUYLER, JR.
Commissioner of Patents